(12) United States Patent
Urabe et al.

(10) Patent No.: US 7,890,973 B2
(45) Date of Patent: Feb. 15, 2011

(54) INFORMATION PROCESSING APPARATUS AND CONTROL METHOD THEREFOR

(75) Inventors: Hirofumi Urabe, Kawasaki (JP);
Yoshikazu Shibamiya, Tokyo (JP);
Kazuhiro Matsubayashi, Yokohama (JP); Kazuna Maruyama, Fuchu (JP);
Yasushi Shikata, Tama (JP); Koji Mito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 11/780,755

(22) Filed: Jul. 20, 2007

(65) Prior Publication Data
US 2008/0052614 A1 Feb. 28, 2008

(30) Foreign Application Priority Data
Aug. 24, 2006 (JP) .............................. 2006-228345

(51) Int. Cl.
*G06F 3/00* (2006.01)
(52) U.S. Cl. ...................................................... 725/39
(58) Field of Classification Search .................... 725/39
See application file for complete search history.

(56) References Cited

U.S. PATENT DOCUMENTS

| | | | | |
|---|---|---|---|---|
| 6,177,931 B1 * | 1/2001 | Alexander et al. | ............. | 725/52 |
| 6,757,707 B1 * | 6/2004 | Houghton et al. | ........... | 709/203 |
| 6,901,438 B1 * | 5/2005 | Davis et al. | ................. | 709/219 |
| 2003/0005463 A1 * | 1/2003 | Macrae et al. | .............. | 725/112 |
| 2005/0125844 A1 | 6/2005 | Maruyama et al. | .......... | 725/135 |
| 2005/0160462 A1 | 7/2005 | Shikata et al. | ................ | 725/58 |
| 2007/0255703 A1 | 11/2007 | Maruyama et al. | ............. | 707/5 |

FOREIGN PATENT DOCUMENTS

| | | |
|---|---|---|
| JP | H01-307944 | 12/1989 |
| JP | H10-177532 | 6/1998 |
| JP | H11-275537 | 10/1999 |
| JP | 2000-307993 | 11/2000 |
| JP | 2002-300491 | 10/2002 |

* cited by examiner

*Primary Examiner*—Andrew Y Koenig
*Assistant Examiner*—Alfonso Castro
(74) *Attorney, Agent, or Firm*—Fitzpatrick, Cella, Harper & Scinto

(57) ABSTRACT

An information processing apparatus which, in addition to displaying an electronic program guide in a display screen, uses URL information in order to display web pages when there is URL information associated with the programs displayed in the electronic program guide. Program information and the URL information concerning associated web pages are stored in correlated form and a determination is made, for instance, as to whether any URL information is associated with an in-focus program in the electronic program guide. If there is associated URL information, the URL information is used to display a web page. If the web page is switched, a determination is made as to whether there is a program associated with the web page obtained as a result of the switch and, if there is an associated program, the focus is changed to that program.

5 Claims, 16 Drawing Sheets

FIG. 8

| PROGRAM TITLE | PROGRAM INFORMATION | ASSOCIATED WEB PAGE |
|---|---|---|
| PROGRAM 1 | START TIME, PERFORMERS, ... | URL1 |
| PROGRAM 2 | START TIME, PERFORMERS, ... | URL2 |
| ... | ... | ... |

Web PAGE FOCUS

| | CH1 | CH2 | CH3 | CH4 |
|---|---|---|---|---|
| 6 | 00 PROGRAM 1 | 00 PROGRAM 5 | 00 PROGRAM 7 | 00 PROGRAM 10 |
| 7 | 00 PROGRAM 2 | | 54 PROGRAM 8 | |
| 8 | 15 PROGRAM 4 | 00 PROGRAM 6 | 00 PROGRAM 9 | |
| 9 | | | | |

6:00 ~ 8:00   PROGRAM 5

- PROGRAM 5 HOME PAGE
- PROGRAM DESCRIPTION
- PERFORMERS
- RE-BROADCASTING SCHEDULE
- Q&A
- ASSOCIATED PROGRAM 1
- ASSOCIATED PROGRAM 2

| CH | ASSOCIATED Web PAGE |
|---|---|
| CH1 | URL1 |
| CH2 | URL2 |
| ... | ... |

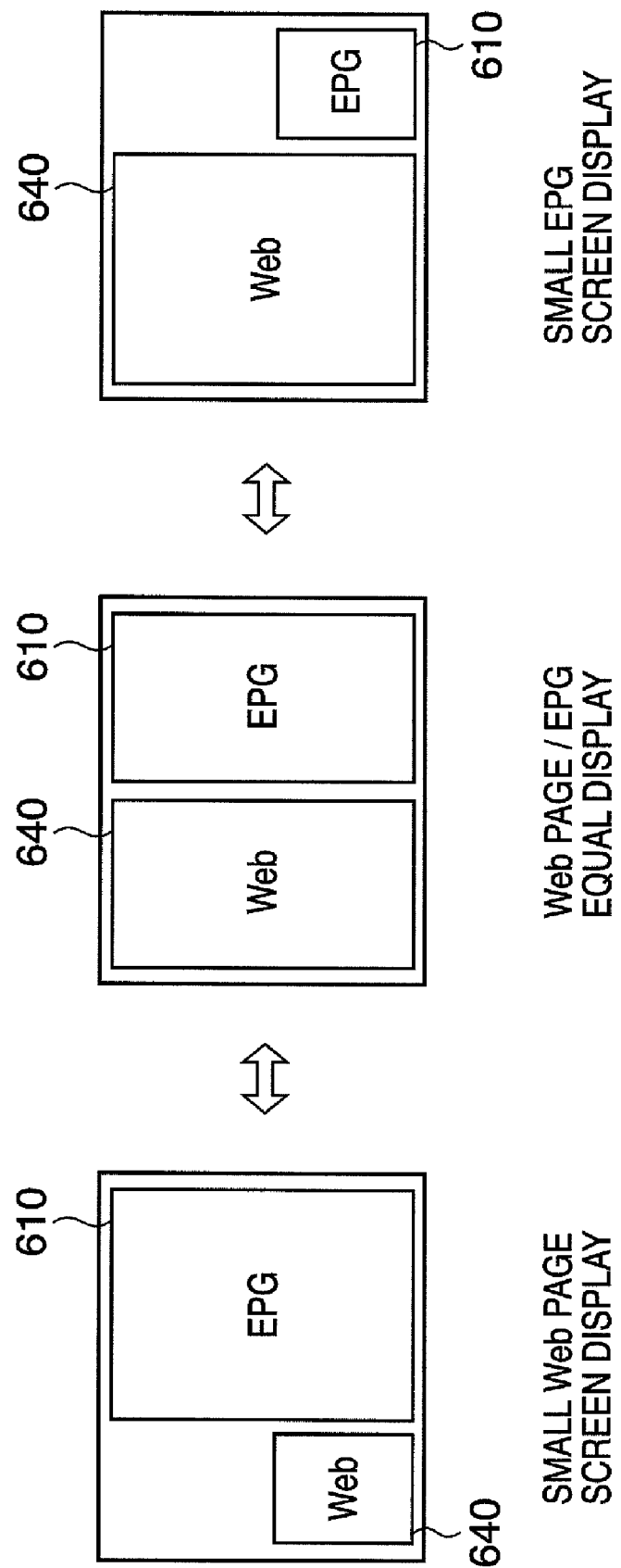

6 CHANNELS (NO Web PAGE DISPLAY)

4 CHANNELS + Web PAGE

INFORMATION PROCESSING APPARATUS AND CONTROL METHOD THEREFOR

BACKGROUND OF THE INVENTION

1. Field of the Invention

The present invention relates to an information-processing apparatus and a control method therefor, and, in particular, relates to an information processing apparatus capable of displaying an electronic program guide (hereinafter referred to as "EPG") and web pages and a control method therefor.

2. Description of the Related Art

In recent years, there has been an increase in the number of broadcast reception devices capable of displaying an EPG and permitting viewing and scheduling of recording and the like of broadcast programs using the EPG. Moreover, broadcast receivers with a network connection (e.g., receivers providing the ability to connect to the Internet and browse web pages and the like) are not unusual either.

Here, in the format of an ordinary EPG, such as the one disclosed in Japanese Patent Laid-Open No. H1-307944, by plotting channels on one axis of an orthogonal coordinate system and plotting time on the other axis, each broadcast program is allocated to an area defined by a channel and a time slot.

Moreover, an official web page providing information on broadcast programs is produced by each broadcasting station. In addition, such a web page typically offers more information than the information displayed in the EPG. In addition to the official web page, there often are web pages related to the programs and performers, such as performers' personal web pages and program fan sites. Below, web pages associated with programs are referred to as associated web pages. Associated web pages may be represented by the above-mentioned official web page or by unofficial web pages such as fan sites.

For this reason, proposals have been put forth regarding technologies for linking broadcast programs and associated web pages. For instance, Japanese Patent Laid-Open No. H10-177532 proposed a device utilizing URL information contained in EPG data in order to display web pages on a TV screen being linked to TV programs. Moreover, in the information receiver proposed in Japanese Patent Laid-Open No. H11-275537, EPG data is transmitted along with URL information attached thereto and when a program to be viewed is selected from the program guide, the information receiver simultaneously displays program video images and a web page corresponding to the URL information. Moreover, Japanese Patent Laid-Open No. 2002-300491 proposed a device displaying a program guide and chat information on screen by associating TV program information with chat information regarding the TV programs.

However, in the devices described in Japanese Patent Laid-Open No. H10-177532 and Japanese Patent Laid-Open No. H11-275537, the only thing displayed in conjunction with programs on the EPG screen is URL information concerning the associated web pages. In addition, a special user command was required to display the associated web pages corresponding to the URL information. It should be noted that according to Japanese Patent Laid-Open No. 2002-300491, chat-related information is displayed along with the program information. However, to display the chat, the user had to issue commands via a screen such as the one depicted in FIG. 10.

Furthermore, in the devices described in Japanese Patent Laid-Open No. H10-177532, Japanese Patent Laid-Open No. H11-275537, and Japanese Patent Laid-Open No. 2002-300491, the display of the EPG was terminated during the display of the associated web pages. For this reason, it was necessary to display the EPG again and re-select the desired program when, upon checking the associated web pages, the user wanted to view the program, schedule viewing or recording and the like. Moreover, the EPG had to be displayed again and the desired program had to be re-selected if the user, by following links contained in associated web pages, discovered the associated web pages of other programs and wanted to view or record these programs.

SUMMARY OF THE INVENTION

The present invention was made with account taken of the problems of the conventional technology and improves the ease of use of electronic program guides.

According to one aspect of the present invention, an information processing apparatus capable of displaying an electronic program guide and a web page on a display unit by respectively allocating them to prescribed areas in a display screen displayed in the display unit, comprises:

a storage unit that stores program-related information and web page URL information in association with each other, an electronic program guide generation unit that acquires electronic program guide data and generates an electronic program guide that can be displayed in the display unit, a determination unit determining whether the storage unit stores web page URL information that is associated with information relating to a program being included in the electronic program guide, a web page generation unit that, if the web page URL information associated with the program being included in the electronic program guide, acquires web page data using the web page URL information and generates a web page that can be displayed in the display unit based on the acquired web page data, and an operation unit that receives command input in order to perform operations on the web page displayed in the display unit, wherein the web page generation unit acquires new web page data and generates a new web page when a currently displayed web page is changed to the new web page as a result of the command input received by the operation unit, the determination unit determines whether there is a program associated with the new web page based on URL information of the new web page and the web page URL information stored in the storage unit, and if the results of the determination made by the determination unit show that there is a program associated with the new web page, the electronic program guide generation unit generates the electronic program guide such that the program is in a selected state in the electronic program guide.

According to another aspect of the present invention, a control method for an information processing apparatus that, along with being capable of displaying an electronic program guide and a web page on a display unit by respectively allocating them to prescribed areas in a display screen of the display unit, has a storage unit that stores program-related information and web page URL information in association with each other, comprises:

an electronic program guide generation step of acquiring electronic program guide data and generating an electronic program guide that can be displayed in the display unit, a determination step of determining whether the storage unit stores web page URL information that is associated with information relating to a program being included in the electronic program guide, a web page generation step, in which, if the web page URL information associated with the program being included in the electronic program guide, acquiring web page data using the web page URL information and generating a web page that can be displayed in the display unit based on the acquired web page data, and an operation step of receiving command input in order to perform an operation on the web page displayed in the display unit, wherein the web page generation step acquires new web page data and generating a new web page when a currently displayed web page is changed to the new web page as a result of the command input received in the operation step, the determination step determines whether there is a program associated with the new web page based on URL information of the new web page and the web page URL information stored in the storage unit, and if the results of the determination made in the determination step show that there is a program associated with the new web page, the electronic program guide generation step involves generating an electronic program guide in such a manner that this program is in a selected state in the electronic program guide.

According to still another aspect of the present invention, a control method for an information processing apparatus that has a display screen including an electronic program guide display screen and a web page display screen and is capable of displaying an electronic program guide and a web page at the same time, comprises:

a setting step of setting a focus on a program among a plurality of programs displayed in the electronic program guide;

a first display step of displaying, if there is information concerning a web page associated with the program on which the focus is set by the setting step, the web page in the web page display screen;

a switching step of switching the web page displayed in the web page display screen to another web page;

a determination step of determining whether there is a program associated with the another web page; and, a second display step of displaying, if the determination step determines that there is an associated program, the electronic program guide in which the focus is set to the associated program.

Further features of the present invention will become apparent from the following description of exemplary embodiments with reference to the attached drawings.

BRIEF DESCRIPTION OF THE DRAWINGS

FIG. 8 is a diagram illustrating an example of the program information table stored in a memory unit 1150 in the TV receiver 11 according to the first embodiment.

FIG. 13 is a diagram illustrating an exemplary channel information table stored in the memory unit 1150 during EPG display processing in the TV receiver 11 according to another embodiment of the present invention.

FIGS. 15A to 15C are diagrams illustrating examples of various display proportions between the web area and EPG area in the TV receiver 11 according to another embodiment of the present invention.

DESCRIPTION OF THE EMBODIMENTS

Preferred embodiments of the present invention will now be described in detail in accordance with the accompanying drawings.

Embodiment 1

Figure 1:
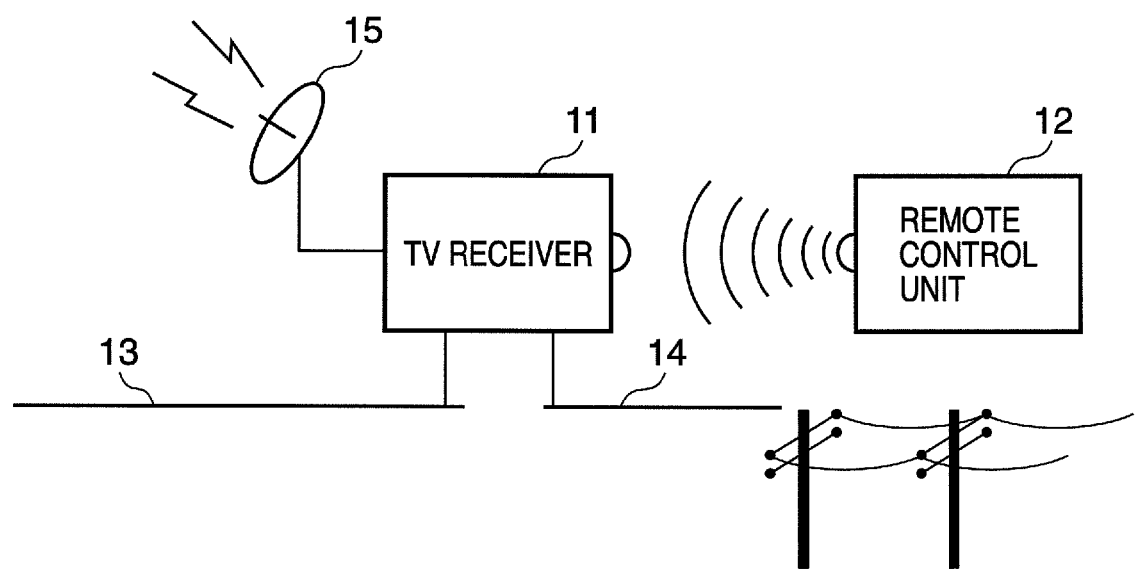
FIG. 1 is a diagram schematically illustrating a TV receiver 11 in use, the receiver being an example of the information processing apparatus used in a first embodiment of the present invention.

FIG. 1 is a diagram schematically illustrating a TV receiver 11 in use, the receiver being an example of the information processing apparatus used in a first embodiment of the present invention.

It should be noted that in the present Specification, the term "information processing apparatus" is used to collectively refer to the so-called television receivers, as well as to personal computers (PC) and mobile terminals having built-in TV tuners, etc.

The television receiver (hereinafter referred to simply as "TV receiver") 11 is capable of receiving digital broadcasting and can display an EPG based on EPG information contained in the digital broadcasting. The TV receiver 11 is connected to a network 13, such as a LAN, and to a phone line 14. The network 13 is connected to the Internet through a router or the like.

In addition, a remote control device (remote control unit) 12 is used by the user for issuing various commands to the TV receiver 11, for data entry and the like. The TV receiver 11 receives digital broadcasting through an antenna 15 or CATV lines, or the like, and carries out data transmission and reception to/from the remote control unit 12. Moreover, the TV receiver 11 carries out data transmission and reception to/from external equipment connected through the network 13 and external interfaces (not shown) (USB, IEEE 1394, Bluetooth (trademark), etc.), controls the external equipment and the like. Additionally, in the display unit, it displays TV video images, an EPG, data acquired from external devices, control information and the like.

Figure 2:
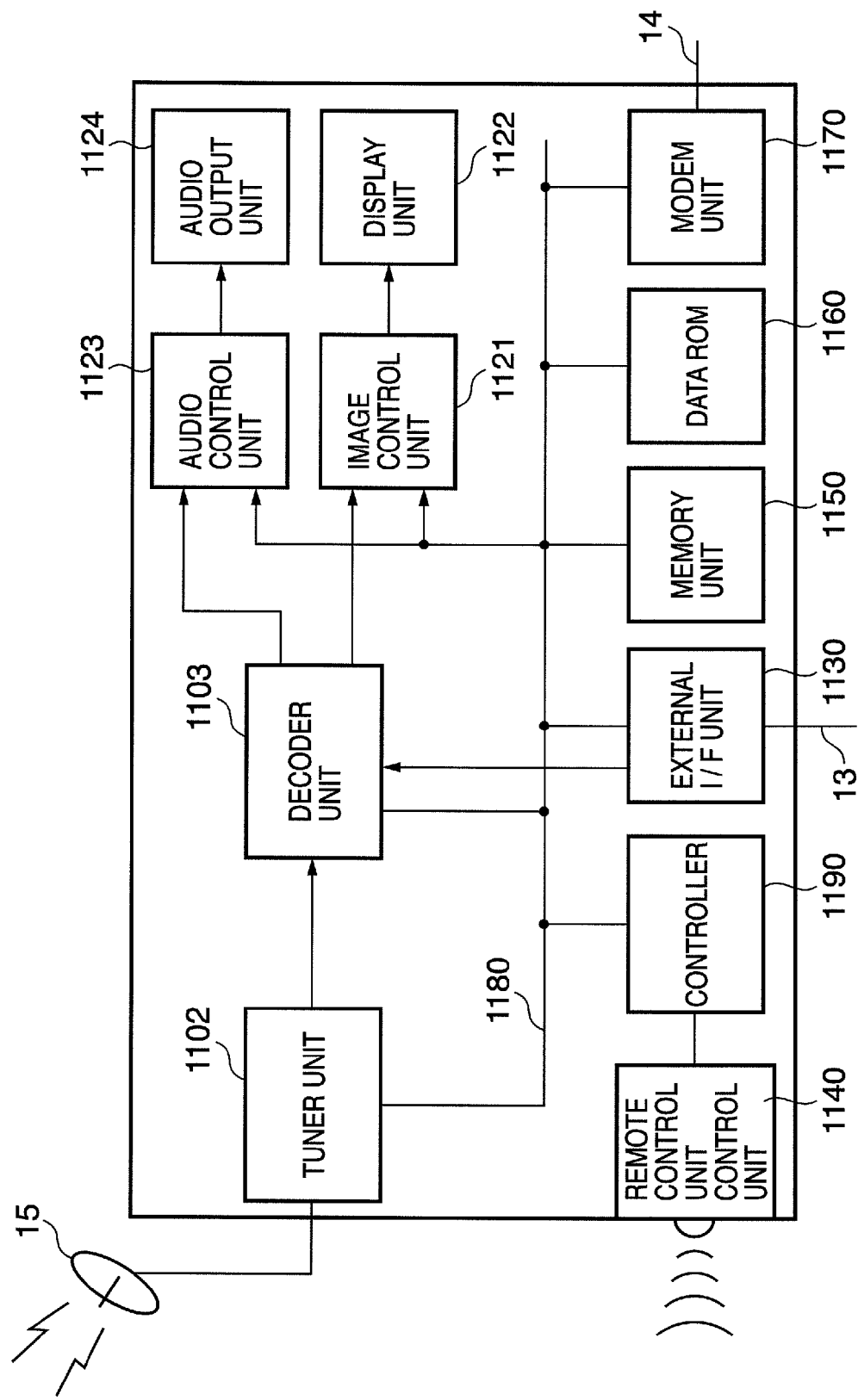
FIG. 2 is a block diagram illustrating an exemplary configuration of the TV receiver 11.

FIG. 2 is a block diagram illustrating an exemplary configuration of the TV receiver 11.

As shown in FIG. 2, the antenna 15 receives a TV signal from outside, converts it to a high-frequency electrical signal, and forwards it to a tuner unit 1102. The tuner unit 1102 amplifies the high-frequency TV signal forwarded from the antenna 15, demodulates the high-frequency TV signal of the selected channel obtained by modulation onto a carrier wave, and outputs it to a decoder unit 1103.

The decoder unit 1103 decodes the signal obtained from the tuner unit 1102. At such time, image, audio, and other data (e.g., broadcast data, EPG data, and other additional data) contained in the signal are separated out and respectively decoded. The image data is output to an image control unit 1121, the audio data to an audio control unit 1123, and the rest of the data to an internal bus 1180, respectively.

The image control unit 1121 either outputs the image data output from the decoder unit 1103 or the image data obtained via the internal bus 1180, or it outputs display image data (RGB image data) obtained by merging the two to a display unit 1122 along with horizontal/vertical synchronizing signals. Subsequently, based on the horizontal/vertical synchronization signals, the display unit 1122 displays RGB image data output from the image control unit 1121 on a screen, not shown.

By controlling sound volume, timbre, ambience characteristics and the like as necessary, the audio control unit 1123 produces an audio signal either from the audio data output from the decoder unit 1103 or the audio data obtained via the internal bus 1180, or from both, and outputs it to an audio output unit 1124. The audio output unit 1124 amplifies the audio signal input from the audio control unit 1123 and outputs the audio from speakers, not shown.

An external I/F unit 1130, which is an interface used for the network 13, is an interface conforming to a standard such as USB, IEEE 1394, or the like. The external I/F unit 1130 carries out data transmission and reception to/from various external devices, such as personal computers, routers, and various audio-visual devices connected via the network 13. Moreover, the external I/F unit 1130 can use the network 13 to carry out data transmission and reception to/from the Internet and other external networks.

A remote control unit control unit 1140 receives data of various sorts transmitted when the user operates the remote control unit 12 and transfers said received data to a controller, 1190.

Through the internal bus 1180, a memory unit 1150 accepts and stores EPG data output from the decoder unit 1103, additional television broadcast data, various data entered through the external I/F unit 1130 and the like.

A data ROM 1160 stores data incorporated in the TV receiver 11 in advance, such as icons, buttons and other image data used when the EPG is displayed, character (font) data used for display and printing and the like.

The TV receiver 11 uses a modem unit 1170 for data interchange with the outside through a phone line 14. For instance, it is used when transmitting viewing information to a management server for calculating charges for pay-per-view broadcasts, carrying out data transmission and reception to/from broadcasting stations during interactive broadcast viewing, or when connecting to an internet service provider.

The controller 1190 is connected to the internal bus 1180 and exercises centralized control over all of the above-described units in the TV receiver 11. For instance, when receiving a television broadcast, it controls the above-mentioned antenna 15, tuner unit 1102, and decoder unit 1103, and also performs setting and control operations, such as saving data relating to data broadcast and EPG data and the like, as well as channel switching. Moreover, by controlling the image control unit 1121, it carries out control and display setting operations such as merging and switching between image data from decoder unit 1103, and data relating to data broadcast, EPG data and image data from the external I/F unit 1130.

Furthermore, the controller 1190 controls the audio control unit 1123 and carries out the merging and output control of audio data input from all the units. Moreover, the controller 1190 analyzes key code data from the remote control unit 12 received by the remote control unit control unit 1140 and carries out the corresponding processing. Moreover, the controller 1190, which has a clock function capable of determining the date, day of the week, time and the like, manages the day of the week, time and the like and can display them in the display unit 1122.

The internal bus 1180 is a bus interconnecting all the units in the TV receiver 11 as shown in FIG. 2, and, as described above, is used for the transfer of image data, audio data, and so on and for information transfer between the units and the like.

In the TV receiver 11 according to the present embodiment, the generation and display of the EPG is carried out under the control of the controller 1190. Specifically, to generate the EPG, the controller 1190 uses the EPG data output by the decoder unit 1103 and stored by the memory unit 1150 and image data stored in the data ROM 1160. The controller 1190 displays the generated EPG in the display unit 1122 with the help of the image control unit 1121. The EPG is generated, for instance, in response to the entry of an EPG display command from the remote control unit 12 through the remote control unit control unit 1140.

Figure 3:
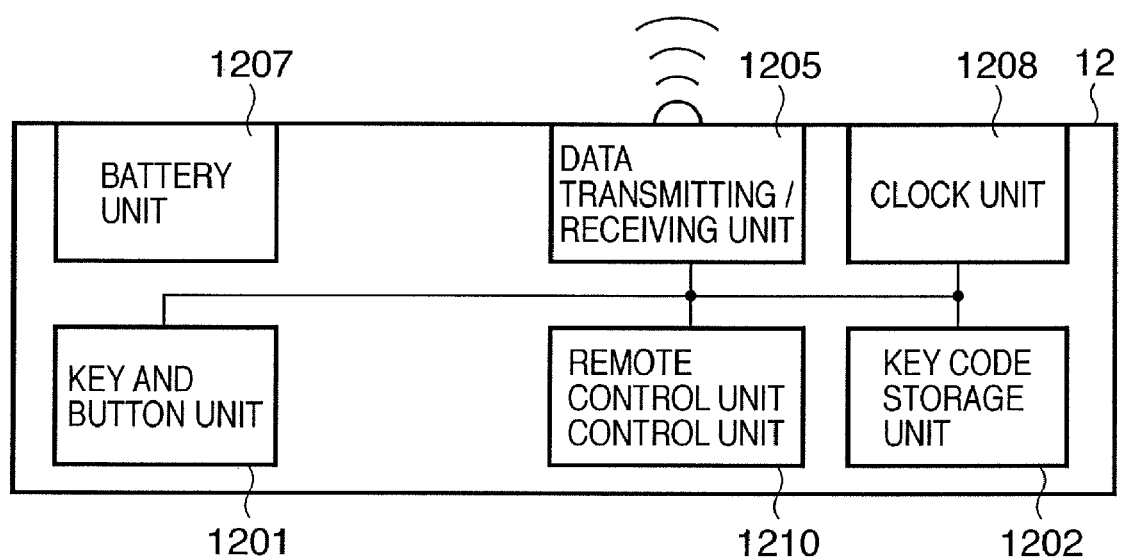
FIG. 3 is a block diagram providing a detailed illustration of an exemplary configuration of a remote control unit 12.

FIG. 3 is a block diagram providing a detailed illustration of an exemplary configuration of the remote control unit 12.

A key and button unit 1201 contains numeric digit keys, arrow keys, an ENTER key, an EPG display command button and the like. The user issues commands related to the desired operations to the TV receiver 11 by depressing buttons on the key and button unit 1201 of the remote control unit 12. A key code storage unit 1202 is a nonvolatile memory storing key codes and the like used for operating and performing configuration of the TV.

Various data, such as key codes etc. corresponding to the depressed keys and buttons, are transmitted by a data transmitting/receiving unit 1205 to the remote control unit control unit 1140 in the TV receiver 11.

A battery unit 1207 supplies electric power for the operation of the remote control unit 12. A clock unit 1208 is a clock capable of acquiring information regarding the date, day of the week, time and the like. In addition to detecting depressed keys and operations performed in the key and button unit 1201, the remote control unit control unit 1210 controls the above-mentioned units.

Thus, the remote control unit 12 according to the present embodiment operates as a device for issuing commands related to displaying the program guide in the electronic program guide display device (TV receiver 11).

Figure 4:
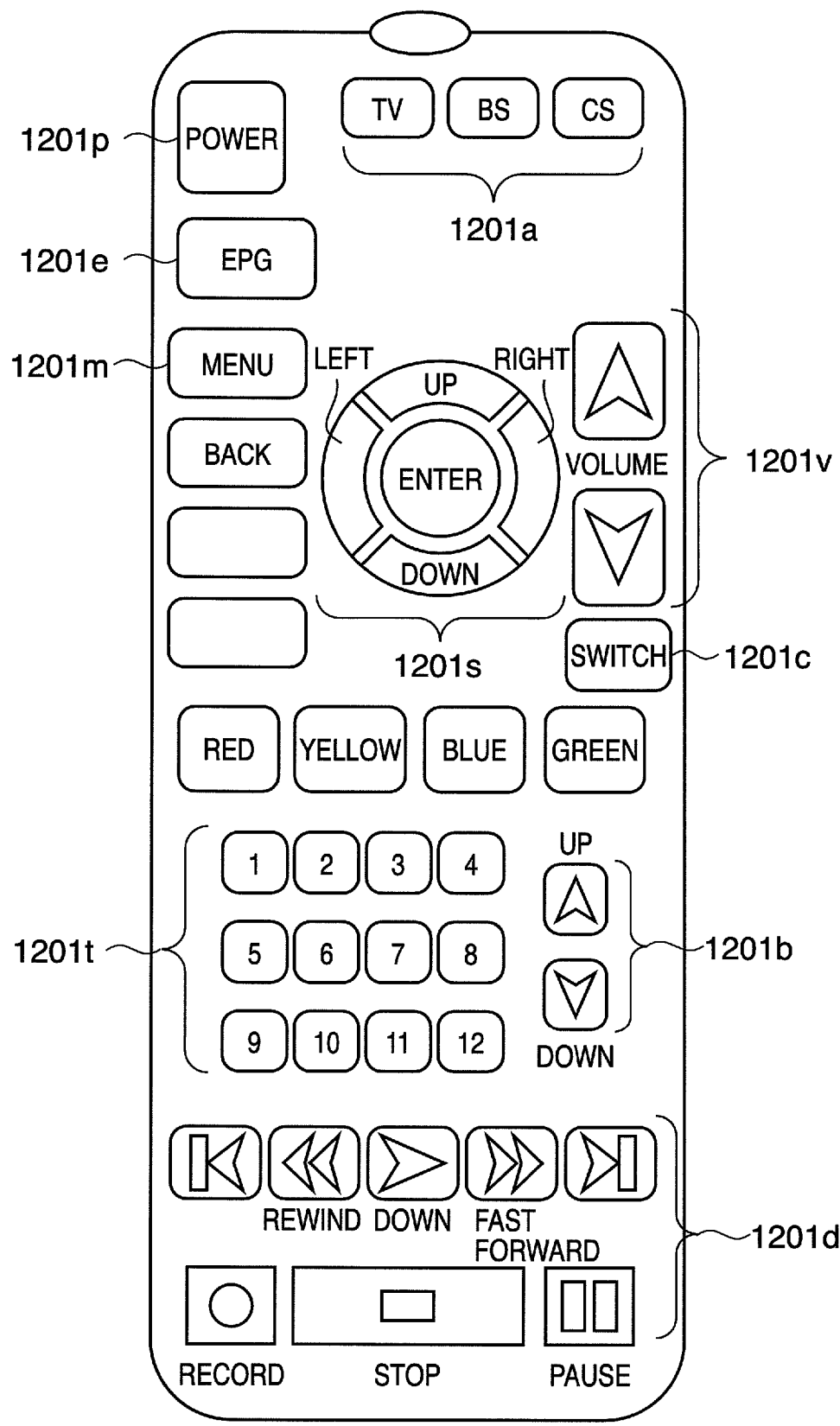
FIG. 4 is a top view illustrating an exemplary appearance of the remote control unit 12.

FIG. 4 is a top view illustrating an exemplary appearance of the remote control unit 12.

In FIG. 4, an EPG display key 1201e is a key used to issue an EPG display command. In response to the depression of the display key 1201e, the TV receiver 11 displays an EPG on the display screen in the display unit. Operation keys 1201s comprise an ENTER key and left, right, up, and down cursor keys arranged around the ENTER key. The operation keys 1201s are used for operating the EPG and menus displayed by the TV receiver 11.

An operational object switching key 1201c is used for operational object switching when the EPG and web pages are displayed simultaneously.

Also, as shown in FIG. 4, the remote control unit 12 is also provided with other keys: a power key 1201p used for turning the power supply of the apparatus main body ON and OFF, and keys 1201a, which are used for switching between digital terrestrial broadcasting, BS (Broadcast Satellite) broadcasting, and CS (Communication Satellite) broadcasting. In addition, the remote control unit 12 is provided with a menu key 1201m used to display an operating menu screen, a volume UP key and a volume DOWN key 1201v used to set audio volume, numeric digit keys 1201t used for TV channel setting and the like, channel UP and DOWN keys 1201b used for UP/DOWN switching between TV channels, and operation keys 1201d used for external devices and the like.

Figure 5:
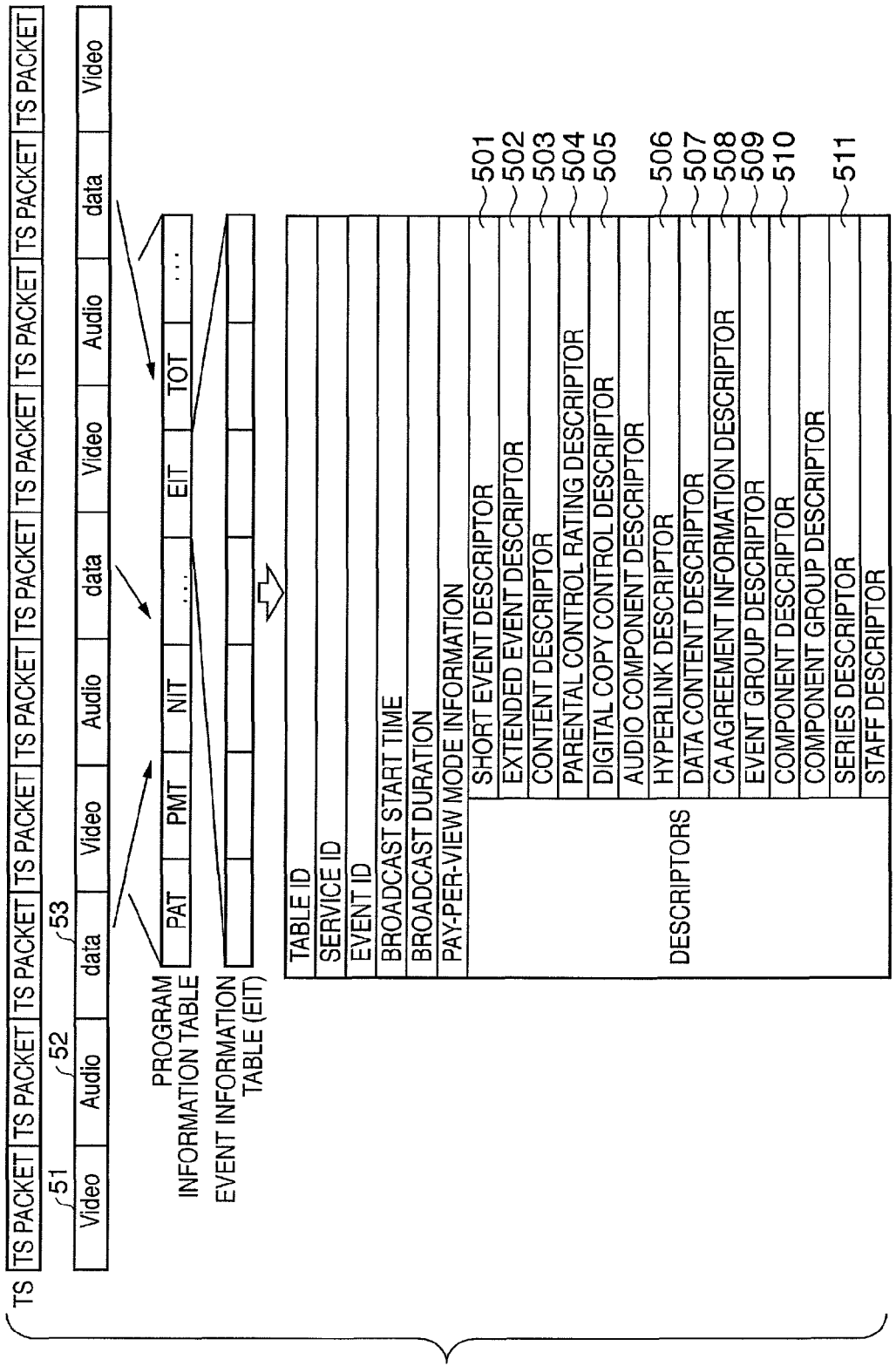
FIG. 5 is a diagram illustrating an exemplary configuration of the received digital broadcast signals and EPG data used in the first embodiment.

FIG. 5 is a diagram illustrating an exemplary configuration of the EPG data and received digital broadcast signal used in the present embodiment.

As shown in FIG. 5, the digitized broadcast signal is known as a "TS signal". TS signals are defined by various standards organizations, including the IEC (International Electro-technical Commission), the IEEE (Institute of Electrical and Electronic Engineers), and the ARIB (Association of Radio Industries and Businesses). TS signals are composed of video portions 51, which represent a moving picture signal, audio portions 52, which represent an audio signal, and data portions 53, which represent a data signal distinct from the above.

When the data portions 53 are collected and reconstructed, a program information table is obtained, which is composed of a PAT (Program Association Table), a PMT (Program Map Table), a NIT (Network Information Table), an EIT (Event Information Table), a TOT (Time Offset Table) and the like.

The EPG data used in the present embodiment is described as a number of items and descriptors in the Event Information Table contained therein. In addition to a table ID, service ID, event ID and the like, the initial portion of the Event Information Table describes such things as program broadcast start time, broadcast duration and the like. Following the above-mentioned items are several descriptors. As far as the descriptors are concerned, only the EPG-related descriptors will be explained here.

The title of a program and explanations concerning the program are provided in a short event descriptor 501. The names of performers, script writers, and program hosts, a description of program and the like are provided in an extended event descriptor 502. The genre of the broadcast program is described in a content descriptor 503. Here, the genre of the broadcast program is defined using large genres, such as "News", "Sports", "Drama", "Movie", "Variety", and "Culture", etc., and mid-level genres obtained by subdivision of the large genres. For instance, some mid-level genres included in the large genre "Sports" will be "Soccer", "Baseball", and "Olympics".

Viewer age restrictions are described in a parental control rating descriptor 504. Information concerning restrictions on digital and analog copying is described in a digital copy control descriptor 505. Links to other programs, internal program links, and program-related information are described in a hyperlink descriptor 506. Information concerning program-related data broadcasts is described in a data content descriptor 507. Information on permissions and the like concerning the scheduling of viewing and recording of pay-per-view programs is described in a CA agreement information descriptor 508. Event sharing and grouping information and event relay link information is described in an event group descriptor 509. Event component combination information, such as for multi-view television and the like, is described in a component descriptor 510. Information on TV program series, re-broadcasting and the like is described in a series descriptor 511. Here, URL information concerning associated web pages is described in the short event descriptor 501, extended event descriptor 502, and hyperlink descriptor 506.

As mentioned above, in the TV receiver 11 according to the present embodiment, a television broadcast signal is received by the antenna 15 and tuner unit 1102 and output to the internal bus 1180 upon extraction of data portions only in the decoder unit 1103. Based on the data output to the internal bus 1180, the controller 1190 reconstructs an EIT and stores it in the memory unit 1150 as EPG data. Then, in response to a request from the remote control unit 12 or the like made by the user, the EPG data is read from the memory unit 1150 and an EPG image, along with EPG display image data stored in the data RON 1160, is generated and displayed in the display unit 1122 via the image control unit 1121.

Figure 6:
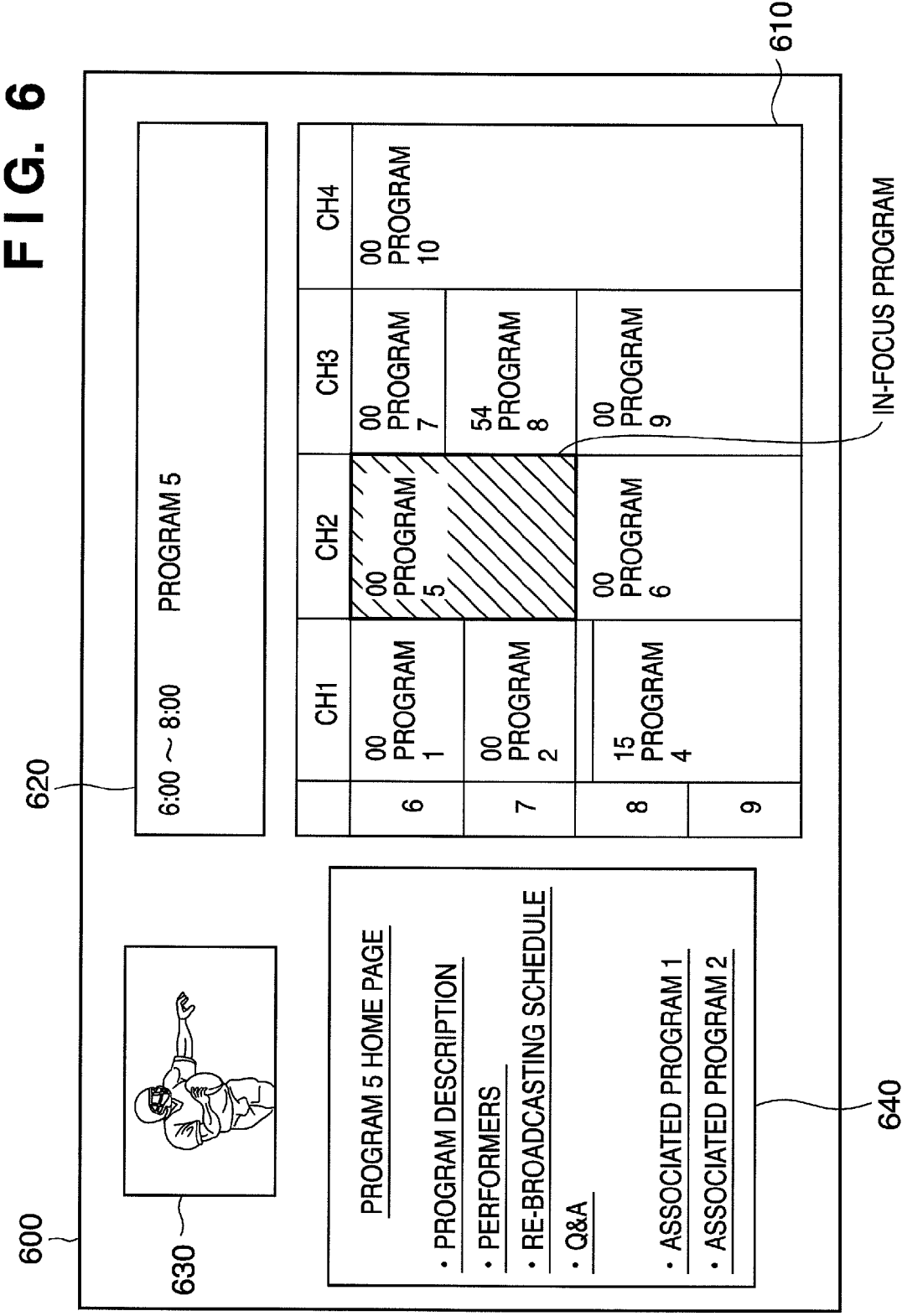
FIG. 6 is a diagram illustrating an exemplary display of the EPG screen in the first embodiment.

FIG. 6 is a diagram illustrating an exemplary EPG screen display in the present embodiment. It should be noted that, for the sake of convenience, FIG. 6 shows an EPG screen display with four hours of programming on four channels.

In the present embodiment, an EPG screen 600 has an EPG area 610, a program information area 620, an image area 630, and a web area 640. The EPG area 610 is a display screen for the EPG. The program information area 620 is an area for displaying information on the program in focus (hereafter referred to as "in-focus program") in the electronic program guide displayed in the EPG area 610. The image area 630 is an area for displaying video images from the "in-focus" program. The web area 640 is an area for displaying a web page associated with the in-focus program.

Figure 7:
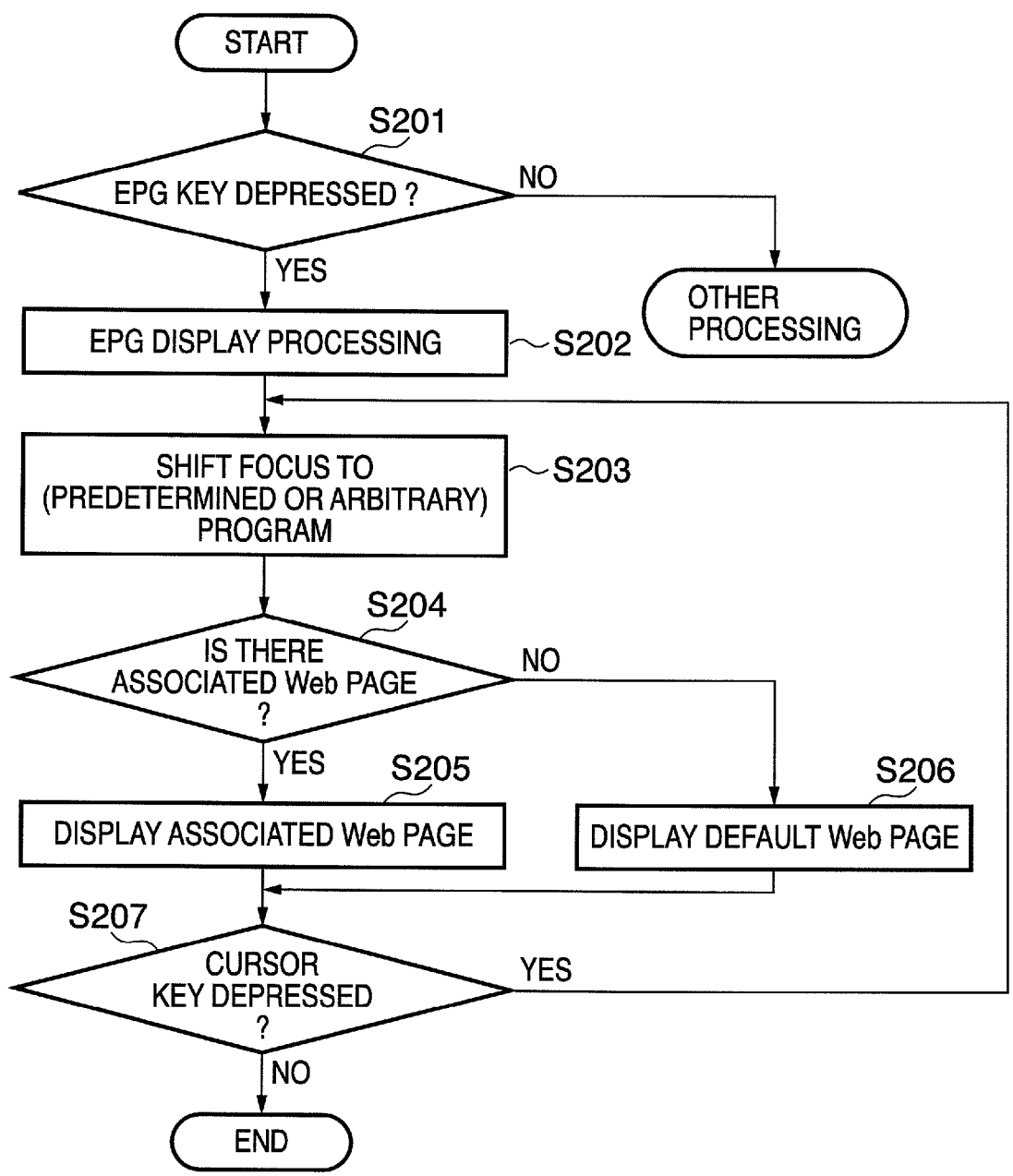
FIG. 7 is a flow chart used to explain EPG display processing and cursor movement processing in the TV receiver 11 according to the first embodiment.

The flow chart shown in FIG. 7 will be used next to explain the EPG display processing and cursor movement processing performed in the TV receiver 11 of the above-described configuration.

When the power supply is turned ON, a broadcast signal is received by the above-described TV receiver 11 and data is extracted from the received broadcast signal. It is also assumed that, as shown in FIG. 8, the program information table is stored in the memory unit 1150 in a format that correlates at least program-related information (program titles, start times, etc.) and URL information concerning program-associated web pages.

The URL information of the associated web pages contained in the program information table is acquired by the controller 1190 performing a search to determine whether URL information is included in the data portions 53 extracted from the broadcast signal. If it is included, the controller 1190 extracts the URL information and registers the URL information in correlation with corresponding information on the programs. Alternatively, the user may use the remote control unit 12 in advance to enter arbitrary URLs and register them in association with programs, or register the URL of the displayed web page in association with an arbitrary program. Thus, the method of acquisition or registration of URLs for associated web pages is irrelevant as long as it permits storage in correlation with program-related information.

To browse the EPG while viewing a television broadcast, the user issues an EPG display command to the TV receiver 11. Specifically, the user presses the EPG display key 1201e on the remote control unit 12. As a result, an EPG display command signal is transmitted from the data transmitting/receiving unit 1205 of the remote control unit 12 and the remote control unit control unit 1140 of the TV receiver 11 receives it.

The controller 1190 then determines whether receipt of the EPG display command signal has been detected by the remote control unit control unit 1140 (S201). If it is determined that receipt of the EPG display command signal has been detected, the controller 1190 performs EPG display processing in the manner described above (S202).

Subsequently, the controller 1190 places the focus onto the column of, for example, the program currently being viewed among the programs shown in the EPG displayed in Step S202 (S203). Here, the in-focus program can be determined in an appropriate fashion. For instance, the in-focus program may be a program displayed in a specific location in the EPG, such as in the column in the upper left corner of the EPG.

Next, the controller 1190 refers to the memory unit 1150 to determine whether URL information concerning an associated web page is contained in the program information table corresponding to the in-focus program (S204).

If, as a result of the determination made in Step S204, it is found that URL information concerning an associated web page does exist, the controller 1190 acquires the associated web page data via the external I/F unit 1130, generates the associated web page, and displays it by placing it in the web area 640 (S205).

Moreover, if as a result of the determination made in Step S204 it is found that there is no URL information concerning an associated web page, the controller 1190 displays a different web page (a default web page) in the web area 640 (S206). The default web page may be, for instance, a starting web page determined separately based on network settings, or a web page belonging to the manufacturer of the television device or the like. Storing URL information concerning the default web page in the memory unit 1150 separately from the program information table allows the controller 1190 to display the default web page in the web area 640 in the same manner as the associated web pages.

In Step S207, the controller 1190 is waiting for commands from the user. If it is detected that any one of the cursor keys among the operation keys 1201s on the remote control unit 12 has been depressed, the controller 1190 shifts the focus in accordance with the depressed cursor key (S203) and carries out the processing of Steps S204 to S206 with respect to the new in-focus program.

In addition, if it is detected in Step S207 that a key other than the cursor keys has been depressed, the controller 1190 terminates the cursor movement processing and EPG display processing of FIG. 7.

Figure 9:
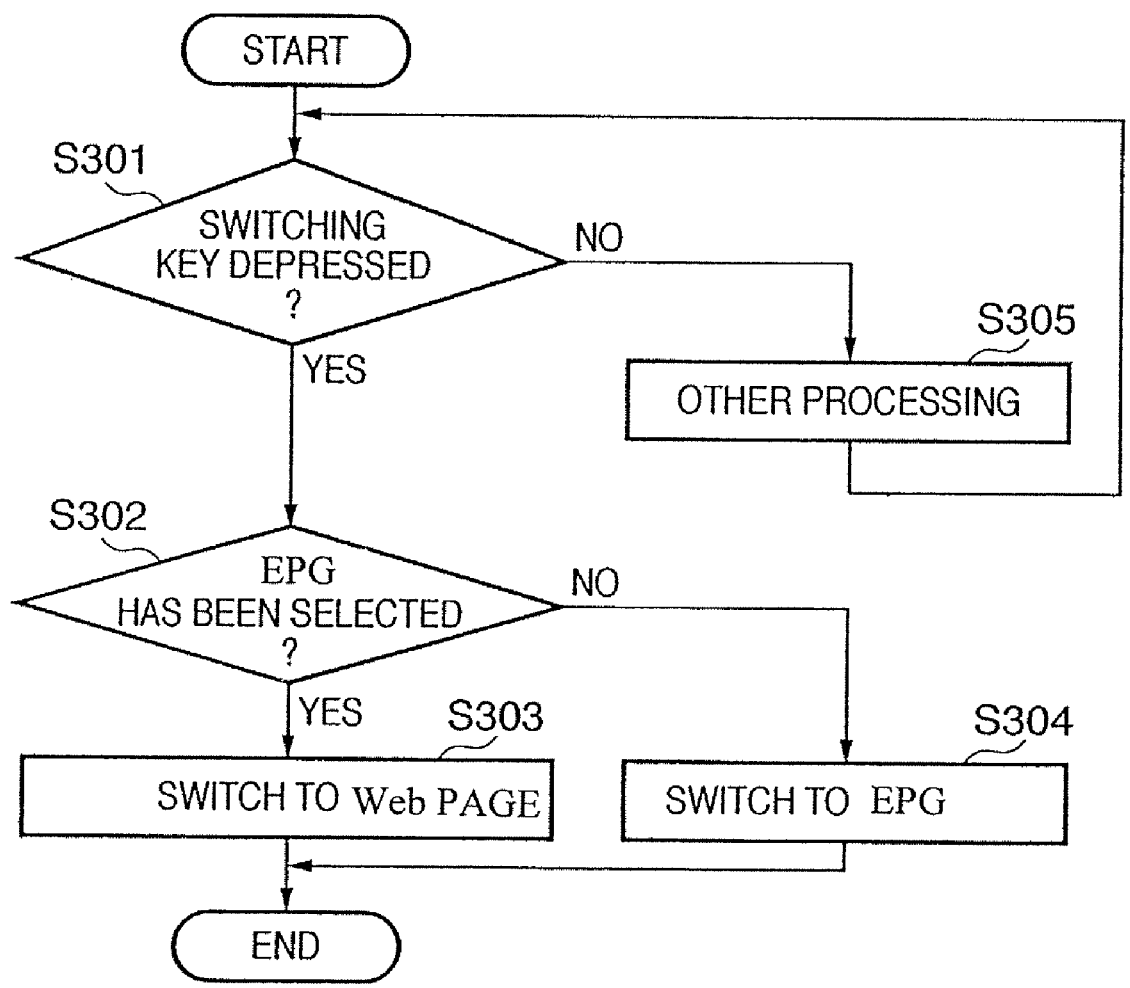
FIG. 9 is a flow chart used for illustrating processing involved in switching the operational object in the TV receiver 11 of the first embodiment from the EPG to a simultaneously displayed web page.

The flow chart shown in FIG. 9 will be used next to explain the process of operational object switching between the EPG and a simultaneously displayed web page.

For instance, if the user wants to switch the operational object in the display state illustrated in FIG. 6, the user depresses the operational object switching key 1201c on the remote control unit 12.

The controller 1190 determines whether a depression of the operational object switching key 1201c has taken place (S301).

If a depression of the operational object switching key 1201c is detected as a result of the determination made in Step S301, the controller 1190 determines whether the current operational object is the EPG (S302).

If, as a result of the determination made in Step S302, it is found that the operational object is the EPG, the controller 1190 switches the web area 640 to the operational object (S303).

Moreover, if as a result of the determination made in Step S302 it is found that the operational object is not the EPG (i.e. that the operational object is the web area 640), the controller 1190 switches the operational object to the EPG (S304).

It should be noted that if no depression of the operational object switching key 1201c is detected in Step S301, the controller 1190 determines whether other keys have been detected or not and performs other processing, such as processing corresponding to the detected keys and the like (S305). After that, the controller 1190 again carries out processing to determine whether the operational object switching key 1201c has been detected or not.

Figure 10:
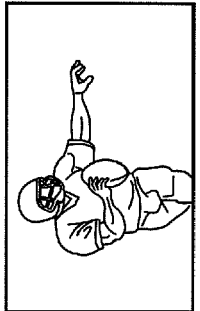
FIG. 10 is a diagram illustrating sample results obtained by executing an operational object switching operation in the TV receiver 11 according to the first embodiment.

In FIG. 6, the operational object is the EPG, and the focus of the EPG is displayed in a thick-border frame. In case of input via the operational object switching key 1201c at such time, the operational object is switched to the web area 640 based on the processing of Step S304. At such time, as shown in FIG. 10, the web area 640 is again displayed in a thick-border frame, thereby allowing the user to ascertain that the operational object has been switched.

Figure 11:
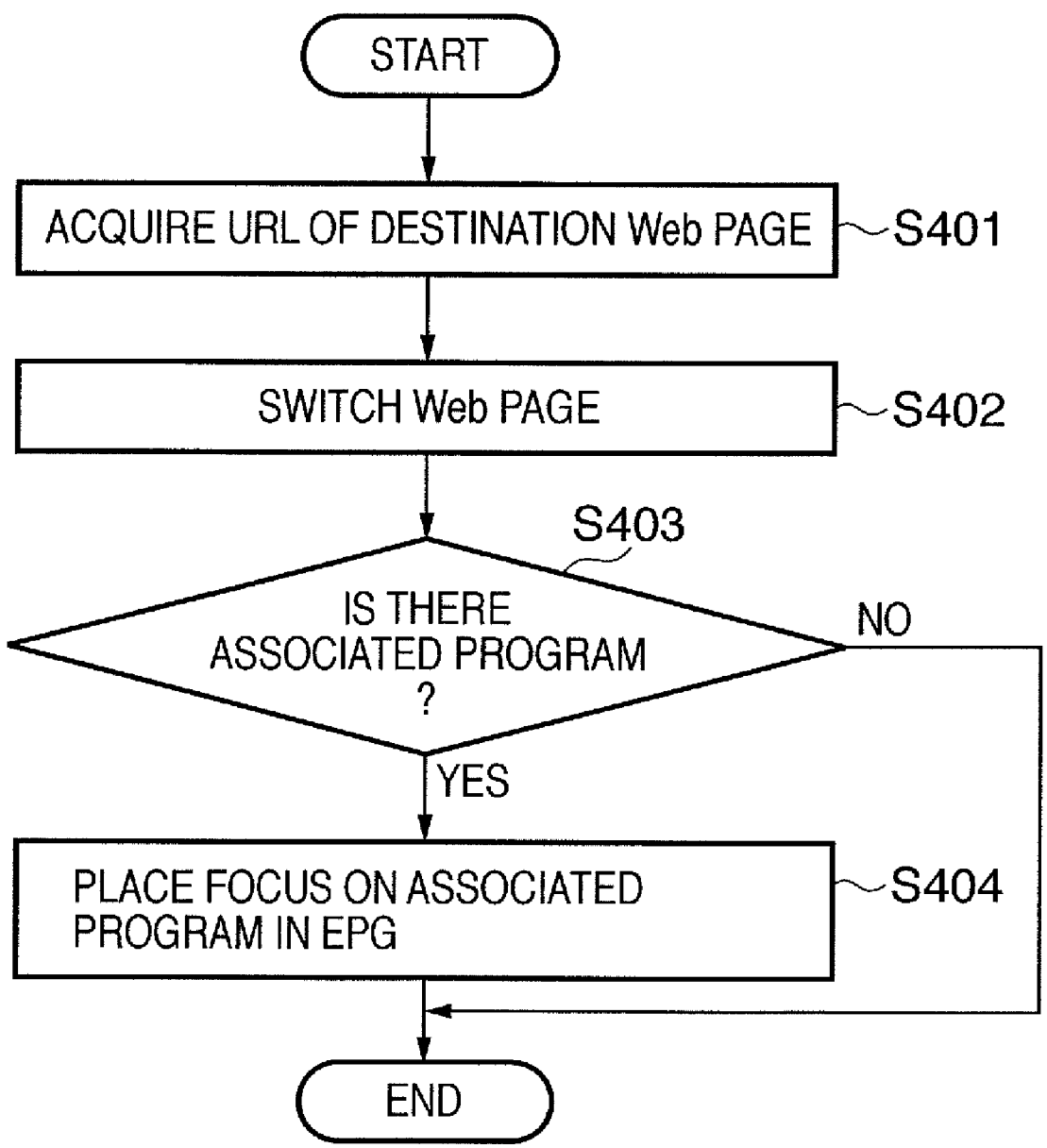
FIG. 11 is a flow chart for illustrating EPG linked display processing corresponding to operations performed in a web area 640 in the TV receiver 11 according to the first embodiment.

EPG linked display processing corresponding to operations performed in the web area 640 is explained next using the flow chart illustrated in FIG. 11.

If the operational object is the web area 640, the controller 1190 monitors link selection and determination of the web page resulting from operating the ENTER key and cursor keys on the remote control unit 12. Then, for instance, if a depression of the ENTER key is detected in a state, wherein the focus has been placed on a certain link, the controller 1190 acquires the URL information of the destination web page contained in the link (S401).

Next, the controller 1190 uses the URL information acquired in Step S401 to perform a web page switching operation (S402). In other words, the controller 1190 uses the URL information acquired in Step S401 to access the website via the external I/F unit 1130 and acquire web page data. The controller 1190 then displays it in the web area 640.

Subsequently, the controller 1190 retrieves the URL information of the associated web page contained in the program information table saved to the memory unit 1150 and determines whether there is a program associated with the destination URL (S403).

If as a result of the determination made in Step S403 it is found that there is a program, for which the URL information of the associated web page contained in the program information table matches the destination URL information, the controller 1190 shifts the focus of the SPG to the program associated with the destination web page (S404). It should be noted that in terms of matching between the destination URL information and URL information concerning the associated web page, it does not matter whether the URLs match completely or partially.

Figure 12:
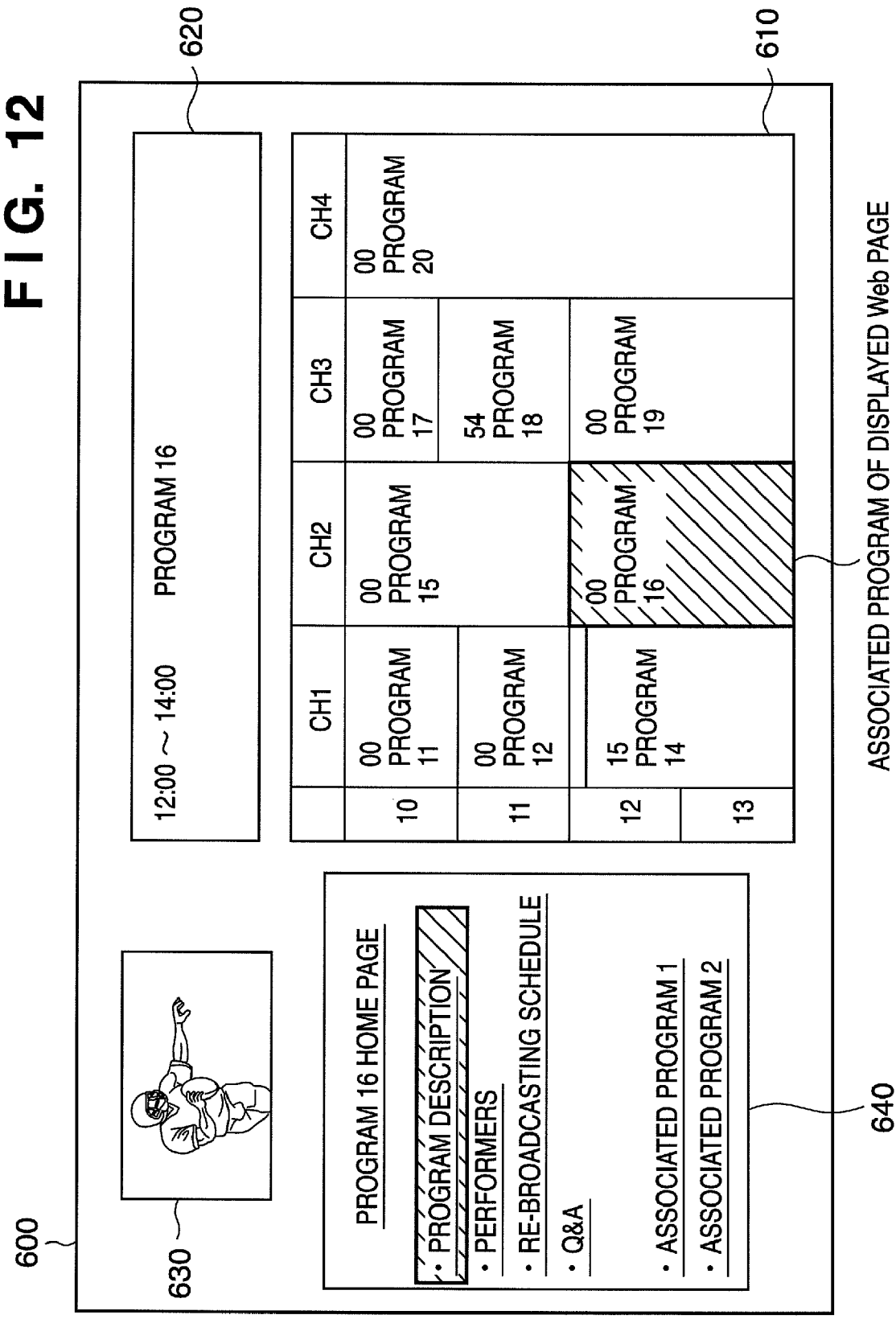
FIG. 12 is a diagram illustrating sample results obtained by executing an EPG focus movement processing operation corresponding to operations performed in the web area 640 in the TV receiver 11 according to the first embodiment.

For instance, let us assume that while the associated web page of Program 5 was displayed, as shown in FIG. 10, the web page was manipulated and the associated web page of Program 16 was displayed. In this case, as shown in FIG. 12, the controller 1190 places the focus onto Program 16 along with switching, as needed, the displayed EPG such that the EPG displayed in the EPG area 610 includes Program 16.

In this manner, when the displayed web page contents are switched, the TV receiver 11 of the present embodiment determines whether there is a program associated with the web page displayed after the switch and, if there is such an associated program, displays the EPG with the focus placed onto that program. For this reason, if the user wants to view or schedule the viewing or recording or the like of the program associated with the web page being displayed, the user can immediately perform the desired operation in the EPG if the operational object is switched to the EPG area 610 by depressing the operational object switching key 1201*c* on the remote control unit 12.

In other words, unlike the conventional equipment capable of displaying an EPG and web pages, the apparatus allows the user to check the associated web page of the program selected in the EPG without performing special operations. In addition, it allows for displaying and performing operations on web pages while the EPG is displayed and makes it possible to easily carry out operations such as viewing, scheduling of viewing, and scheduling of recording and the like of programs associated with a new web page discovered by performing operations.

Other Embodiments

The configuration of the first embodiment involved displaying an associated web page for the in-focus program of the EPG on the EPG screen. However, if there are channel-associated web pages, it is also possible to configure the apparatus to display the web page associated with the channel of the in-focus program.

Figure 13:
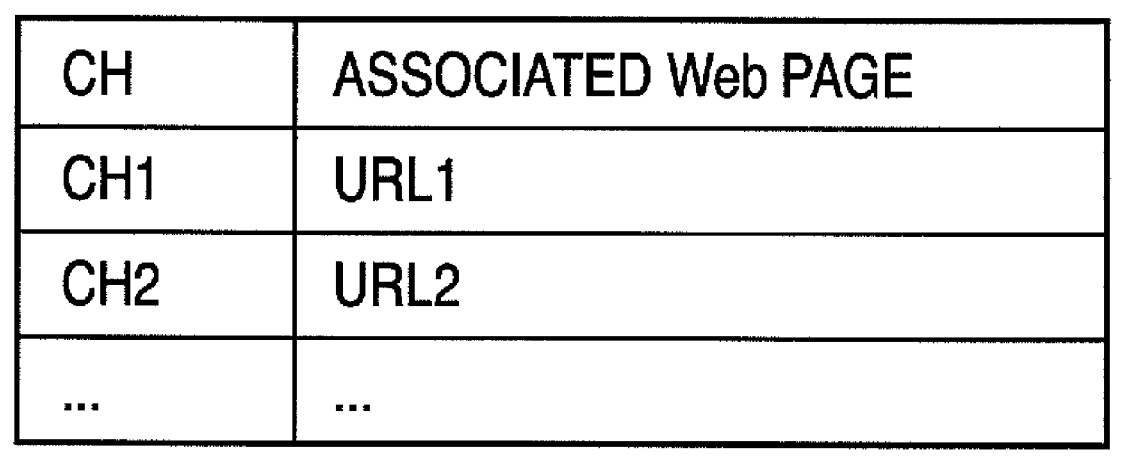

In such a case, as shown in FIG. 13, the channels displayed in the EPG and URL information concerning channel-associated web pages are stored in correlated form in the memory unit 1150. Subsequently, during the above-described processing of Steps S204 to S206, instead of displaying the associated web page of the in-focus program, the controller 1190 determines the presence of, and displays the associated web page of the channel of that program.

Figure 14:
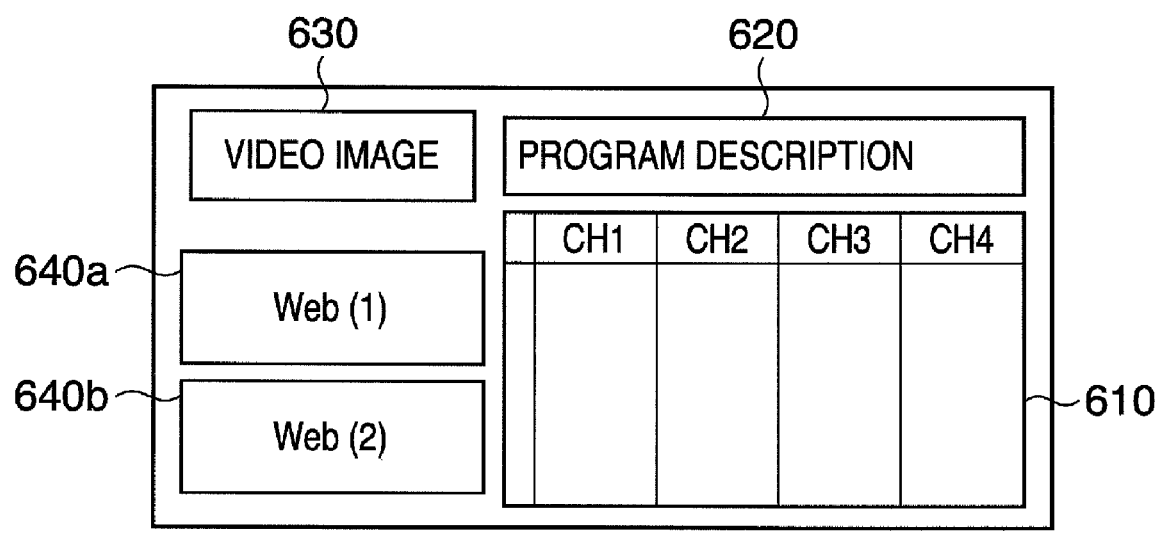
FIG. 14 is a diagram illustrating an example, in which multiple web areas are provided on the EPG screen in the TV receiver 11 according to another embodiment of the present invention.

In addition, while the first embodiment described an example with a single web area 640 provided on the EPG screen, it is also possible to provide two web areas as shown in FIG. 14. In such a case, the apparatus can be configured to simultaneously display a program-associated web page, such as the one explained in the first embodiment, in one web area 640*a*, and a channel-associated web page in the other web area 640*b*.

In such a case, during the above-described processing of Steps S204 to S206, the controller 1190 determines the presence of, and carries out display processing for, the associated web page of the in-focus program and that of its channel.

In addition, while the first embodiment illustrated a program information table that associated a program with URL information concerning a single associated web page, a program information table that associates a program with multiple pieces of URL information can be created if there are multiple associated web pages. In such a case, the multiple associated web pages can be displayed in multiple web areas 640*a* and 640*b*. Moreover, if there is one web area 640, multiple web pages may be generated and the displayed associated web page may be successively switched at predetermined times.

In such a case, the program information table used in the first embodiment stores each program in the memory unit 1150 in correlation with URL information concerning multiple associated web pages. Then, during the associated web page display process of Step S205, the controller 1190 switches the URL information of the displayed associated web page and displays it at predetermined times, for example every five seconds.

In addition, as shown in FIG. 15A, the first embodiment described a case in which the web area 640 on the EPG screen 600 was made smaller than the EPG area 610. However, as shown in FIGS. 15B and 15C, the display proportions of the web area 640 and EPG area 610 can be changed. Specifically, the web area 640 and EPG area 610 can be made identical in size (FIG. 15B) and the web area 640 can be made larger than the EPG area 610 (FIG. 15C). The function of issuing commands regarding such switching may be assigned to a key on the remote control unit 12. If a command is issued to change the display proportions during the display of the EPG screen 600, the controller 1190 successively switches the display to the changed proportions.

It should be noted that the smaller area among the EPG area 610 and web area 640 may be displayed by superposing it over the larger one (as a picture-in-picture).

Figure 16B:
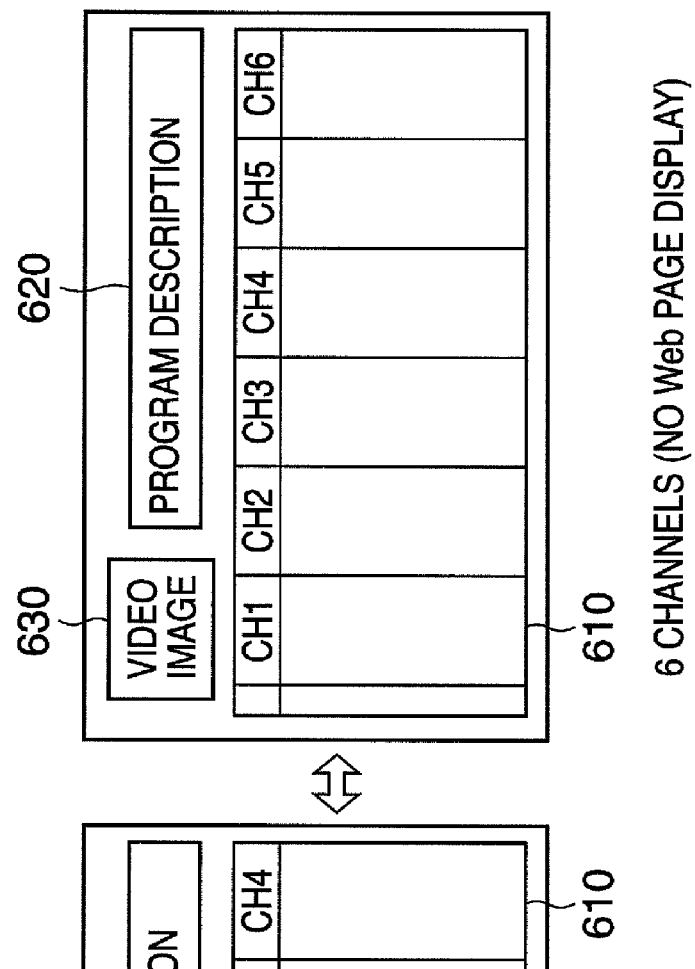
FIGS. 16A and 16B are diagrams illustrating display examples, in which the web area is switched ON and OFF on the EPG screen in the TV receiver 11 according to another embodiment of the present invention.
Figure 16A:
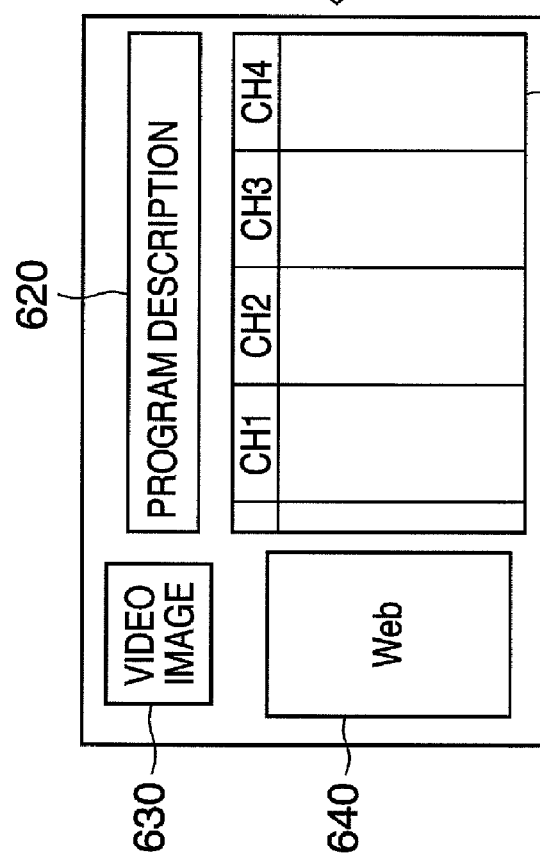

In addition, although the web area 640 was necessarily provided on the EPG screen in the first embodiment, the apparatus can be configured to be capable of dynamic switching between a display providing the web area 640 and one that does not. FIG. 16A shows an example of a case in which the web area 640 is provided, and FIG. 16B that of a case, in which the web area 640 is not provided.

In this case, setting information related to whether a web area is provided on the EPG screen 600 (i.e., whether a web page is displayed) is stored in the memory unit 1150, in advance. The controller 1190 then refers to the contents of the setting information concerning the initiation of the EPS display and carries out the EPG display processing described in the first embodiment if there is a setting requiring web page display. On the other hand, if the setting is not to display web pages, the controller 1190 displays a conventional EPG screen without displaying web pages.

In addition, in the first embodiment, it is expected that display data (web page) acquisition for program-associated web pages will take some time. For this reason, when the focus is placed on a certain program, associated web page information concerning programs expected to be in focus next (e.g., programs displayed adjacent to the in-focus program above, below, to the left, or to the right thereof) is used to acquire display data (web pages) in advance. Doing so makes it possible to display web pages faster during the subsequent focus shift resulting from cursor key operation.

In this case, during the web display processing steps S205 to S206 of the first embodiment, the controller 1190, upon displaying the initial web page, performs the determination processing of Step S204 with respect to the programs displayed above, below, to the left, and to the right of the current in-focus program in the EPG. Subsequently, if there are associated web pages, the controller 1190 acquires associated web page data via the external I/F unit 1130 and stores it in the memory unit 1150. If it is determined in Step S207 that a cursor key has been depressed and the focus has been shifted, the controller 1190 displays a web page using the data stored in the memory unit 1150 in advance.

Moreover, while the EPG used in the first embodiment was created from a digital TV broadcast signal, an EPG can be created using TV guide information provided by websites on the Internet and data obtained from program guide services and the like.

The above-described embodiment can also be implemented via software using the computer (or CPU, MPU, etc.) of a system or apparatus.

Accordingly, the computer program supplied to the computer in order to implement the above-described embodiment on a computer is itself an implementation of the present invention. In other words, the computer program used to implement the functionality of the above-described embodiment is itself one of the present inventions.

It should be noted that the computer program used to implement the above-described embodiment can be in any shape or form so long as it is computer readable. For instance, it can be composed of script data supplied to an OS, programs executed by an interpreter, object code, or the like, but is not limited thereto.

The computer program used to implement the above-described embodiment is supplied to a computer on a storage medium or over a wired or wireless communication. Storage media used to supply the program include, for instance, floppy disks, hard disks, magnetic tape, and other magnetic storage media, MO, CDs, DVDs, and other optical or magneto-optical storage media, nonvolatile semiconductor memory or the like.

Methods used to supply the computer program over a wired or wireless communication include a method that makes use of a server on a computer network. In such a case, a data file (program file) that may constitute the computer program implementing the present invention is stored on the server in advance. The program file may be executable or source code.

The program file is supplied to client computers accessing the server by downloading the program files. In such a case, the program file may be divided into multiple file segments, with the file segments residing on different servers.

In other words, server equipment supplying the program file implementing the above-described embodiment to client computers is also one of the present inventions.

In addition, it is also possible to distribute storage media containing the computer program used to implement the above-described embodiment in encrypted form, supply users satisfying predetermined criteria with information on a key capable of decrypting the encryption, and allow the users to install it on their computers. The information on the key can be supplied, for instance, by making it available for download from a home page via the Internet.

Moreover, the computer program used to implement the above-described embodiment may utilize the functionality of the OS already running on the computer.

Furthermore, part of the computer program used to implement the above-described embodiment may be in the form of firmware on an expansion board or the like installed in the computer and may be intended for execution by the CPU provided on the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-228345, filed on Aug. 24, 2006, which is hereby incorporated by reference herein in its entirety.

What is claimed is:

1. An information processing apparatus capable of displaying an electronic program guide and a web page on a display unit by respectively allocating them in an EPG display area and a Web page display area of a display screen of the display unit, comprising:

a storage unit that stores program-related information and web page URL information associated with each other in advance;

an electronic program guide generation unit that acquires electronic program guide data and generates an electronic program guide that can be displayed in the EPG display area;

a web page generation unit that acquires web page data and generates a web page that can be displayed in the Web page display area based on the acquired web page data;

a display control unit that generates display screen data in which the electronic program guide generated by the electronic program guide generation unit is allocated in the EPG display area and the web page generated by the web page generation unit is allocated in the Web page display area; and an operation unit that receives a command input in order to select either of the web page and the electronic program guide to be operated and, if the Web page is selected, further receives a command input from a user in order to display a Web page and if the electronic program guide is selected, further receives a command input from the user in order to select a program from programs included in the electronic program guide, wherein, when a command input to change a currently displayed web page to the new web page is received by the operation unit, the web page generation unit acquires web page data based on URL information of the new web page and generates a new web page that can be displayed in the Web page display area, the electronic program guide generation unit determines whether there is a program associated with the new web page based on the URL information of the new web page and, the program-related information and the web page URL information stored in the storage unit, and if the results of the determination show that there is a program associated with the new web page, the electronic program guide generation unit generates a new electronic program guide in which a focus is set to the program associated with the new web page and the display control unit generates display screen data in which the new electronic program guide generated by the electronic program guide generation unit is allocated in the EPG display area and the new web page generated by the web page generation unit is allocated in the Web page display area, and wherein, when the command input in order to select a program included in an electronic program guide displayed in the EPG display area is received by the operation unit, the electronic program guide generation unit generates a new electronic program guide in which a focus is set to the selected program and determines whether there is a web page associated with the selected program based on the information stored in the storage unit, and if the results of the determination show that there is a web page associated with the selected program, the web page generation unit acquires web page data of the web page associated with the selected program and generates a web page associated with the selected program that can be displayed in the Web page display area, and the display control unit generates display screen data in which the electronic program guide, in which a focus is set to the selected program and generated by the electronic program guide generation unit, is allocated in the EPG display area and the web page, associated with the selected program and generated by the web page generation unit, is allocated in the Web page display area.

2. The information processing apparatus according to claim 1, wherein the web page URL information stored in the storage unit is information obtained by extracting URL information multiplexed over a broadcast signal or URL information arbitrarily entered by a user.

3. A control method for an information processing apparatus that, along with being capable of displaying an electronic program guide and a web page on a display unit by respectively allocating them in an EPG display area and a Web page display area of a display screen of the display unit, comprises
- a storage unit that stores program-related information and web page URL information associated with each other in advance,
- an electronic program guide generation unit that acquires electronic program guide data and generating an electronic program guide that can be displayed in the EPG display area,
- a web page generation unit that acquires web page data and generates a web page that can be displayed in the Web page display area based on the acquired web page data,
- a display control unit that generates display screen data in which the electronic program guide generated by the electronic program guide generation unit is allocated in the EPG display area and the web page generated by the web page generation unit is allocated in the Web page display area, and
- an operation unit that receives a command input to select either of the web page and the electronic program guide is to be operated and, if the Web page is selected, further receives a command input from a user in order to display a Web page and if the electronic program guide is selected, further receives a command input from the user in order to select a program from programs included in the electronic program guide, said method comprising:
  - a step in which, when a command input to change a currently displayed web page to the new web page is received by the operation unit the web page generation unit acquires web page data based on a URL information of the new web page and generates a new web page that can be displayed in the Web page display area,
  - the electronic program guide generation unit determines whether there is a program associated with the new web page based on the URL information of the new web page and, the program-related information and the web page URL information stored in the storage unit, and
  - if the results of the determination show that there is a program associated with the new web page, the electronic program guide generation unit generates a new electronic program guide in which a focus is set to the program associated with the new web page and the display control unit generates display screen data in which the new electronic program guide generated by the electronic program guide generation unit is allocated in the EPG display area and the new web page generated by the web page generation unit is allocated in the Web page display area; and
  - a step in which, when the command input in order to select a program included in an electronic program guide displayed in the EPG display area is received by the operation unit,
  - the electronic program guide generation unit generates a new electronic program guide in which a focus is set to the selected program and determines whether there is a web page associated with the selected program based on the information stored in the storage unit, and
  - if the results of the determination show that there is a web page associated with the selected program, the web page generation unit acquires web page data of the web page associated with the selected program and generates a web page associated with the selected program that can be displayed in the Web page display area, and the display control unit generates display screen data in which the electronic program guide, in which a focus is set to the selected program and generated by the electronic program guide generation unit, is allocated in the EPG display area and the web page, associated with the selected program and generated by the web page generation unit, is allocated in the Web page display area.

4. The control method for an information processing apparatus according to claim 3, wherein the web page URL information stored in the storage unit is information obtained by extracting URL information multiplexed over a broadcast signal or URL information arbitrarily entered by a user.

5. A non-transitory computer-readable storage medium storing a software program for causing a computer to operate as an information processing apparatus capable of displaying an electronic program guide and a web page on a display unit by respectively allocating them in an EPG display area and a Web page display area of a display screen of the display unit, comprising:
- a storage unit that stores program-related information and web page URL information associated with each other in advance;
- an electronic program guide generation unit that acquires electronic program guide data and generates an electronic program guide that can be displayed in the EPG display area;
- a web page generation unit that acquires web page data and generates a web page that can be displayed in the Web page display area based on the acquired web page data;
- a display control unit that generates display screen data in which the electronic program guide generated by the electronic program guide generation unit is allocated in the EPG display area and the web page generated by the web page generation unit is allocated in the Web page display area; and
- an operation unit that receives a command input in order to select either of the web page and the electronic program guide to be operated and, if the Web page is selected, further receives a command input from a user in order to display a Web page and if the electronic program guide is selected, further receives a command input from the user in order to select a program from programs included in the electronic program guide,
- wherein, when a command input to change a currently displayed web page to the new web page is received by the operation unit,
- the web page generation unit acquires web page data based on a URL information of the new web page and generates a new web page that can be displayed in the Web page display area,
- the electronic program guide generation unit determines whether there is a program associated with the new web page based on the URL information of the new web page and, the program-related information and the web page URL information stored in the storage unit, and
- if the results of the determination show that there is a program associated with the new web page, the electronic program guide generation unit generates a new electronic program guide in which a focus is set to the program associated with the new web page and the display control unit generates display screen data in which the new electronic program guide generated by the electronic program guide generation unit is allocated in the EPG display area and the new web page generated by the web page generation unit is allocated in the Web page display area, and wherein, when the command input in order to select a program included in an electronic program guide displayed in the EPG display area is received by the operation unit, the electronic program guide generation unit generates a new electronic program guide in which a focus is set to the selected program and determines whether there is a web page associated with the selected program based on the information stored in the storage unit, and if the results of the determination show that there is a web page associated with the selected program, the web page generation unit acquires web page data of the web page associated with the selected program and generates a web page associated with the selected program that can be displayed in the Web page display area, and the display control unit generates display screen data in which the electronic program guide, in which a focus is set to the selected program and generated by the electronic program guide generation unit, is allocated in the EPG display area and the web page, associated with the selected program and generated by the web page generation unit, is allocated in the Web page display area.

* * * * *